US012792911B2

(12) United States Patent
Krabach et al.

(10) Patent No.: US 12,792,911 B2
(45) Date of Patent: Nov. 10, 2026

(54) SEMANTIC MEMORY VECTOR DATABASE CONSOLIDATION AND GENERATIVE MODEL UPDATE

(71) Applicant: Microsoft Technology Licensing, LLC, Redmond, WA (US)

(72) Inventors: Brian Scott Krabach, Snohomish, WA (US); Samuel Edward Schillace, Portola Valley, CA (US); Umesh Madan, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 404 days.

(21) Appl. No.: 18/406,046

(22) Filed: Jan. 5, 2024

(65) Prior Publication Data

US 2025/0225387 A1 Jul. 10, 2025

(51) Int. Cl.
*G06N 3/08* (2023.01)
*G06N 5/04* (2023.01)

(52) U.S. Cl.
CPC ................. *G06N 3/08* (2013.01); *G06N 5/04* (2013.01)

(58) Field of Classification Search
CPC ...... G06N 3/08; G06N 5/04; G06F 16/33295; G06F 16/25
See application file for complete search history.

(56) References Cited

U.S. PATENT DOCUMENTS

2024/0355131 A1* 10/2024 Kuppersmith ............ G06T 1/60
2025/0156453 A1* 5/2025 Conway .............. G06F 16/3329
2025/0200330 A1* 6/2025 Das ...................... G06N 3/0455

OTHER PUBLICATIONS

Bisson, Simon, "Semantic Kernel: A Bridge Between Large Language Models and Your Code | InfoWorld", Retrieved from URL: https://www.infoworld.com/article/2338321/semantic-kernel-a-bridge-between-large-language-models-and-your-code.html, Apr. 17, 2023, pp. 1-6.

Brakmic, Harris, "Intro to Semantic Kernel—Part Four", Retrieved from URL: https://blog.brakmic.com/intro-to-semantic-kernel-part-four/, Oct. 17, 2023, pp. 1-7.

International Search Report and Written Opinion received for PCT Application No. PCT/US2024/059261, mailed on Apr. 8, 2025, 15 pages.

Wang, et al., "A Survey on Large Language Model based Autonomous Agents", In repository of arXiv:2308.11432V2, Sep. 7, 2023, pp. 1-35.

International Preliminary Report on Patentability (Chapter I) received for PCT Application No. PCT/US2024/059261 mailed on Jul. 16, 2026, 9 pages.

* cited by examiner

*Primary Examiner* — Dave Misir
(74) *Attorney, Agent, or Firm* — Alleman Hall LLP

(57) ABSTRACT

A computing system monitors inference conditions of a generative model, detects a predetermined trigger condition among the monitored inference conditions, and responsive to detecting the predetermined trigger condition, consolidates a memory vector database of the generative model to thereby extract semantic memories from the vector database, updates the generative model using the extracted semantic memories, and deploys the consolidated generative model. The predetermined trigger condition may be at least one of a database size condition, an available memory size condition, a processor load condition, or a scheduled time condition.

20 Claims, 4 Drawing Sheets

SEMANTIC MEMORY VECTOR DATABASE CONSOLIDATION AND GENERATIVE MODEL UPDATE

BACKGROUND

Recently, pre-trained large language models (LLMs) have been developed, which are generative models that generate natural language responses in response to prompts entered by users. LLMs can be incorporated into a variety of computer programs including chatbots, which are programs designed to interact with users in a natural, turn-based conversational manner. Chatbots can facilitate efficient and effective natural language interaction with users, often for the purpose of providing information or answering questions.

Agents have been developed for the purposes of handling the LLM-side of chatbot interactions. In some prior approaches these agents maintain their own semantic memories of the interactions, which are stored so that relevant memories can later be retrieved by these agents in future chatbot interactions to maintain continuity with earlier interactions. However, the continuous interaction of users with these generative models leads to an ever-growing amount of semantic memories, which in addition to being costly can also degrade both the speed and quality of performance.

SUMMARY

To address the above issues, a computing system is provided, comprising processing circuitry configured to execute a generative model program that includes an agent configured to interface with a generative model, and a semantic memory vector database configured to store semantic memories used by the agent to generate responses to messages via the generative mode, monitor inference conditions of a generative model, detect a predetermined trigger condition among the monitored inference conditions, responsive to detecting the predetermined trigger condition, consolidate the semantic memory vector database to thereby extract at least some of the semantic memories from the vector database, and update the generative model using the extracted semantic memories.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
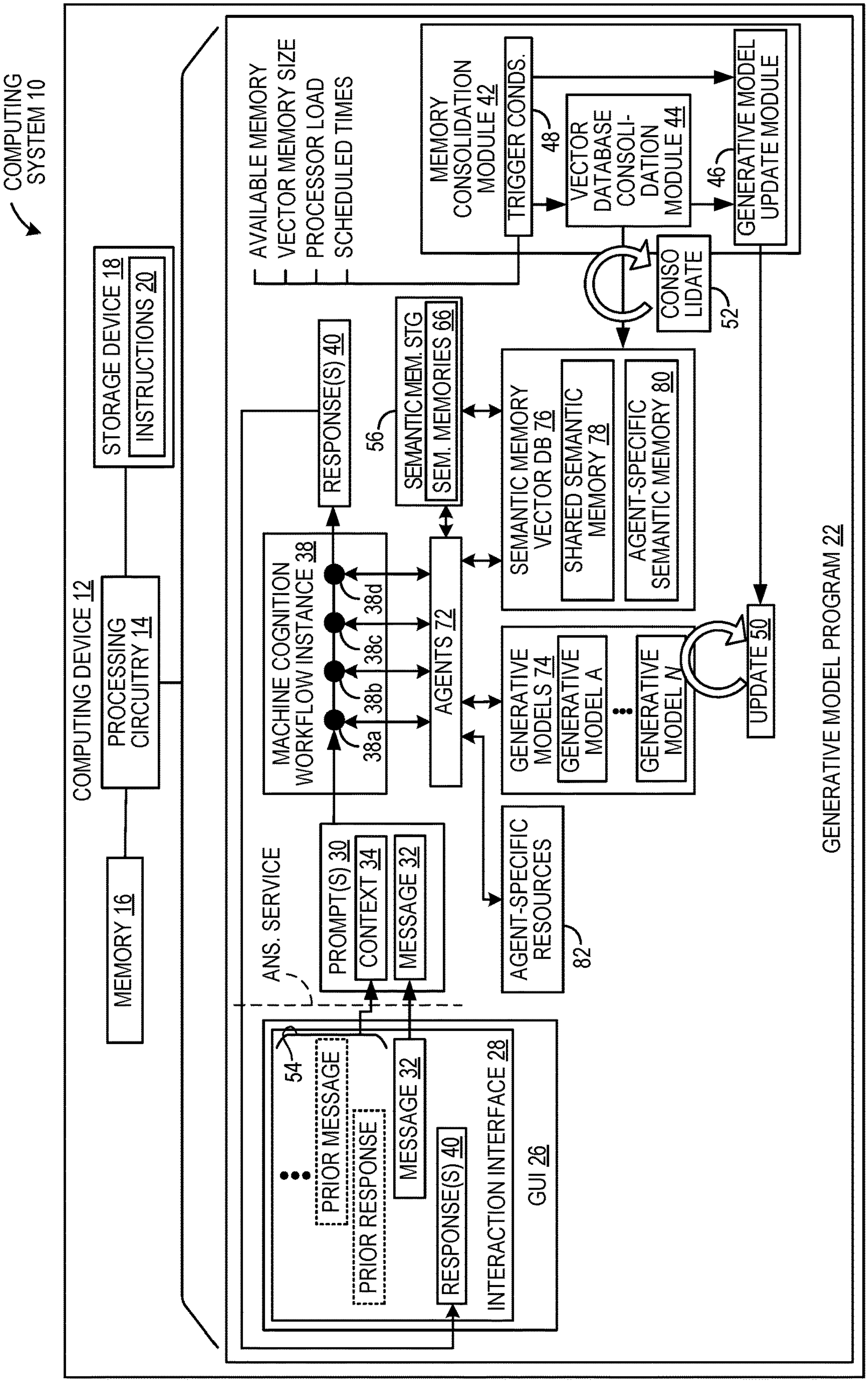
FIG. 1 is a schematic view showing a computing system for consolidating a memory vector database and updating a generative model, according to an example implementation.

To address the issues described above, FIG. 1 illustrates a schematic view of an example computing system 10 configured to enable interactions with a generative model 74 using agents 72 that maintain semantic memories 66 of the interactions. For example, semantic memories 66 may include user inputs and messages generated in response to those inputs, and/or summaries of such exchanges generated by the generative model 74. By way of overview, the computing system 10, upon occurrence of certain trigger conditions 48, is configured to consolidate a semantic memory vector database 76 in which the semantic memories 66 are stored by extracting semantic memories 66 to reduce its size, and to update the generative model 74 based on the extracted semantic memories 66 so that the generative model 74 learns the information in the extracted semantic memories 66. This has the potential technical advantage of moving information contained in the semantic memory vector database 76 to the generative model 74 from time to time so that the information is retained by the system 10 as a whole and not forgotten, while controlling the size of and improving the performance of the semantic memory vector database 76.

The computing system 10 includes a computing device 12 having processing circuitry 14, memory 16, and a storage device 18 storing instructions 20. In this first example implementation, the computing system 10 takes the form of a computing device 12 storing instructions 20 in the storage device 18, including a generative model program 22 that is executable by the processing circuitry 14 to perform various functions. While one computing device 12 is illustrated for purposes of explanation, it will be appreciated that distributed computing strategies may be used, as discussed below. Computing system 10 is configured to implement functions including causing an interaction interface 28 to be presented, receiving, via the interaction interface 28, one or a plurality of messages 32 from a user, and generating a plurality of prompts 30, each including a message 32 and a context 34 of the message 32. The context 34, for example, can be a user interaction history 54 in the interaction interface 28. Additionally, the context 34 may include information from other sources, such as productivity software programs (word processor, spreadsheet, internet browser, slide deck authoring software), communications software programs (email, instant message), social media applications (social networks, short form video platforms, image sharing services), operating system services (live/away indicator), etc.

The generative model program 22 includes one or more agents 72 configured to interface with one or more generative models 74 according to a machine cognition workflow instance 38, to generate the response 40. The machine cognition workflow instance 38 is typically generated by a machine cognition engine (not shown). Agents 72 can be configured with agent-specific prompts, and those agent-specific prompts can be used to encapsulate prompt 30 and send it to a generative model 74. In this way, the agents 72 can make different types of requests of generative model 74 in response to the same prompt 30, and the responses from those different requests can be used to compose the response 40. As an example, in response to a message 32 "Write a book about a boy who finds a lost dog on the way home from school" included in prompt 30 a first agent 72 may be configured via an agent-specific prompt to request a generative model 74 to develop characters for the story, a second agent 72 may be configured to request a generative model 74 to generate a setting for a story given the characters, a third agent 72 may be configured to request a generative model 74 to generate a plot for the story given the setting and characters, and a fourth agent 72 may be configured to request a generative model 74 to write a three chapter story using the characters, setting, and plot generated by the other agents 72. The agents 72 may send their requests to the same generative model 74 or may choose from among a plurality of generative models A-N to send their requests.

The generative model 74 or the plurality of generative models A-N may be a generative model that has been configured through machine learning to receive input that includes natural language text and generate output that includes natural language text in response to the input. It will be appreciated that the generative model 74 or the plurality of generative models A-N can be a large language model (LLM) having tens of millions to billions of parameters, non-limiting examples of which include GPT-3, BLOOM, and LLaMa-2. The generative model 74 or the plurality of generative models A-N can be a multi-modal generative model configured to receive multi-modal input including natural language text input as a first mode of input and image, video, or audio as a second mode of input, and generate output including natural language text based on the multi-modal input. The output of the multi-modal model may additionally include a second mode of output such as image, video, or audio output. Non-limiting examples of multi-modal generative models include Kosmos-2 and GPT-4 VISUAL. Further, the generative model 74 or the plurality of generative models A-N can be configured to have a generative pre-trained transformer architecture, examples of which are used in the GPT-3 and GPT-4 models.

Agents 72 may also be configured to access agent-specific resources 82, such as enterprise-ware, a web-services application programming interface, etc., that enable the agents 72 to provide specific functionality (also referred to as "skills") to the response. For example, one agent 72 may have the ability to access the user's calendar, and another agent 72 may have the ability to access an airline ticketing website API to purchase airline tickets.

The agents 72 can be configured to generate and maintain semantic memories 66 of the interactions with the generative models 74, in a semantic memory subsystem including semantic memory storage 56, which stores so called "flat" representations of semantic memories 66, i.e., memories stored without vector embeddings as text. The semantic memory subsystem also includes a semantic memory vector database 76 in which the flat representations of the semantic memories are tokenized to include vector embeddings, indexed, and then organized using techniques such as Principle Component Analysis or Density-based spatial clustering of applications with noise (DBSCAN) into clusters, so that similar memories are clustered. Links or associations between the vector representations of the memories 66 in the semantic memory vector database 76 and the flat representations of corresponding semantic memories 66 in semantic memory storage 56 are retained. In this way, when semantic memories 66 are identified for extraction as discussed below, both the vector representation and the flat representation can be removed. The semantic memory storage 56 thus stores semantic memories as natural language or text representations that are each linked with associated extracted embeddings or vector representations stored in the semantic memory vector database 76. This configuration allows for each semantic memory to have a distinct vector representation. The semantic memory vector database 76 provides vector search support for agents 72 retrieving semantic memories 66 from semantic memory storage 56, thereby enabling agents 72 to efficiently search for relevant memories among the stored memories in the semantic memory storage 56.

In other embodiments, the extracted embeddings or vector representations may not be exclusively linked to natural language or text representations. Vector representations may also be associated with multi-modal content, which may encompass images. For example, when the multi-modal content includes images, an image-specific encoder may be implemented to generate vector representations that are linked to the visual content of semantic memories. Accordingly, semantic understanding can be maintained across multiple modes of content.

In some instances, the interaction interface 28 may be a portion of a graphical user interface (GUI) 26 for accepting user input and presenting information to a user. In other instances, the interaction interface 28 may be presented in non-visual formats such as an audio interface for receiving and/or outputting audio, such as may be used with a digital assistant. In yet another example the interaction interface 28 may be implemented as an interaction interface application programming interface (API). In such a configuration, the input to the interaction interface 28 may be made by an API call from a calling software program (an answer service, for example) to the interaction interface API, and output may be returned in an API response from the interaction interface API to the calling software program. The API may be a local API or a remote API accessible via a computer network such as the Internet.

It will be understood that distributed processing strategies may be implemented to execute the software described herein, and the processing circuitry 14 therefore may include multiple processing devices, such as cores of a central processing unit, co-processors, graphics processing units, field programmable gate arrays (FPGA) accelerators, tensor processing units, etc., and these multiple processing devices may be positioned within one or more computing devices, and may be connected by an interconnect (when within the same device) or via a packet switched network links (when in multiple computing devices), for example.

For each prompt 30, the generative model program 22 generates a cognitive workflow instance 38 according to a recommended cognitive workflow definition that specifies a plurality of calls to one or more components 38*a-d*. For each prompt, the generative model program 22 executes the generated workflow instance 38 to perform the calls to the one or more components 38*a-d* to thereby generate responses 40 for the plurality of prompts 30. The generated responses 40 may be outputted to be displayed on the interaction interface 28.

The recommended workflow definition defines a sequence of components 38*a-d* in the workflow instance 38 that are to be executed by the generative model program 22, starting with a trigger component 38*a* which marks the beginning of the sequence. Although four components 38*a-d* are depicted in FIG. 1, it will be appreciated that the number of executable components in the workflow instance 38 is not particularly limited, and may be fewer or greater than four components. As the generative model program 22 executes the workflow instance 38, the context 34 of the prompt 30 is passed to each component 38*a-d* of the workflow instance 38, which may be read from or updated by each component 38*a-d* before being passed to the next component 38*b-d* in the workflow instance 38. The response 40 is outputted when the workflow instance 38 is completed. Although a linear pipeline is illustrated, it will be appreciated that branching and forking is possible in the workflow instance, based on decision logic.

Each component 38*a-f* in the workflow instance 38 is configured to make calls to an agent service that instantiates the agents 72. These calls initiate the execution of specific tasks within the workflow instance 38. For instance, a component 38*a-f* may require data analysis, natural language processing, or image recognition capabilities. To fulfill these tasks, a component 38*a-f* may call upon an agent 72 that possesses the requisite skills.

Agents 72 may not only be skill-specific, but also may be configured to generate prompts to send to generative models 74, which may include or be based on prompt 30 or other inputs. This feature enables a dynamic and responsive system where each agent 72 can request information or processing from a generative model 74, so that at least one of the components 38*a-f* interfaces with a generative model 74. For example, an agent 72 specializing in data analytics may generate a prompt requesting a generative model 74 to analyze a complex set of data and return insights.

Each agent 72 may be designed with its own set of skills determining the type of executable tasks. For instance, one agent 72 may be configured to process numerical data, while another may be configured to handle linguistic analysis.

Each agent 72 may retrieve agent-specific resources 82, which may include tools, databases, or software that a particular agent 72 can access. These resources 82 are tailored to the skills of the agent 72. For example, an agent 72 focused on language translation may have access to extensive linguistic databases in the agent-specific resources 82.

Each agent 72 may be equipped with agent-specific semantic memory 80 exclusive to each agent 72 which allows the agent 72 to store and recall information relevant to its tasks. For instance, an agent 72 specializing in user interactions may remember past user preferences to provide a more personalized experience.

In contrast to agent-specific semantic memory 80, shared semantic memory 78 is a common resource accessible by all agent 72 within the workflow instance 38. This shared semantic memory 78 facilitates the exchange and storage of information that is relevant across different agents 72, thereby ensuring coherence and continuity in the workflow instance 38, as agents can access and update shared data. To retrieve stored semantic memories in either shared semantic memory 78 or agent-specific semantic memory 80, each agent can search for semantic memories that are similar to a query, using the semantic memory vector database 76.

New memories added to each of the shared semantic memory 78 and the agent-specific semantic memory 80 may be stored in the semantic memory vector database 76, which accumulates semantic memories and grows in size as users continue to interact with the generative models 74. As the semantic memory vector database 76 grows in size, it may suffer from performance drawbacks including more compute time being required to perform query matching for semantic memory retrieval, higher memory requirements, and potentially a decrease in the quality of query matching due to the large number of semantic memories in the database 76.

To address these potential problems, the memory vector database 76 is consolidated by the memory consolidation module 42 of the generative model program 22 to reduce the size of the semantic memory vector database 76 upon detection of predetermined trigger conditions 48. During this consolidation, at least some of the semantic memories are extracted from the semantic memory vector database 76 and deleted, resulting in a smaller size database. To perform the consolidation, semantic memories stored in the shared semantic memory 78 accessible to the plurality of agents 72 are consolidated by the processing circuitry 14 upon detection of the predetermined trigger condition 48. As used herein the term "consolidation" refers to the operation of extracting and deleting at least some of the stored semantic memories to make the database 76 smaller. The extracted memories can be rewritten or summarized and stored again in the database, or simply deleted, after being extracted. In one implementation, all of the extracted memories are used to update the generative model 74, as described below. In another implementation, some extracted memories are used to update the generative model 74, while other extracted memories are discarded.

As mentioned above, the consolidation process performed by the memory consolidation module 42 is initiated in response to detection of predetermined trigger conditions 48. Thus, responsive to detecting that the one or more predetermined trigger conditions 48 have been met, the memory vector database consolidation module 44 of the memory consolidation module 42 performs consolidation 52 on the semantic memory vector database 76. The predetermined trigger conditions 48 may include a database size condition, an available memory size condition, a processor load condition, or a scheduled time condition. For example, the consolidation process may be initiated when the vector memory size reaches a specified threshold, and/or when processor load decreases below a certain level, when available memory size increases above a specified threshold. The consolidation process may be scheduled at certain predetermined times, such as nighttime or during scheduled maintenance or software updates. The consolidation process may be started based on network traffic analysis, such as during periods of low bandwidth usage.

The consolidation process may be initiated based on predetermined quantitative benchmarks relating to the operational performance of the generative models 74. For example, the thresholds for the predetermined quantitative benchmarks may include response times (latency), variability in response times, processor usage, memory usage, and/or bandwidth consumption.

The above predetermined trigger conditions 48 are monitored as inference conditions in an ongoing monitoring process by the memory consolidation module 42 during the operation of the generative model program 22 at inference time responding to queries. That is, the processing circuitry 14 is configured to monitor the inference conditions of the generative model 74, and to detect a predetermined trigger condition 48 among the monitored inference conditions. It will be appreciated that inference conditions include at least the evaluation of the generative model 74 and/or the plurality of generative models A-N, irrespective of their type or architecture. When such models include a transformer architecture, inference thus includes evaluating a generative transformer. This monitoring process may run as a background process by the processing circuitry 14 as responses 40 are generated by the generative model program 22.

After the semantic memories 66 have been extracted from the semantic memory vector database 76, generative model update module 46 is configured to perform a model update operation on the generative model 74 based on the extracted memories. The technique used to update the generative model 74 is not particularly limited, and may include a full fine-tuning process where all weights in the model are re-computed, an optimized fine tuning process where only certain weights in the model are adjusted using an algorithm such as the Low-Rank Adaptation (LoRA) algorithm, a delta model that is applied to the output of a base model of the generative model 74, and/or other fine tuning of the generative model 74. For example, consolidation 52 performed using LoRA freezes the pretrained model weights and utilizes trainable rank decomposition matrices in each layer of the model's architecture, reducing the number of parameters that are adjusted, saving compute time. Once the generative model is updated in this manner, the generative model update module 46 of the memory consolidation module 42 subsequently deploys the fine-tuned and consolidated model to be used use with the interaction interface as described in FIG. 1.

Figure 2:
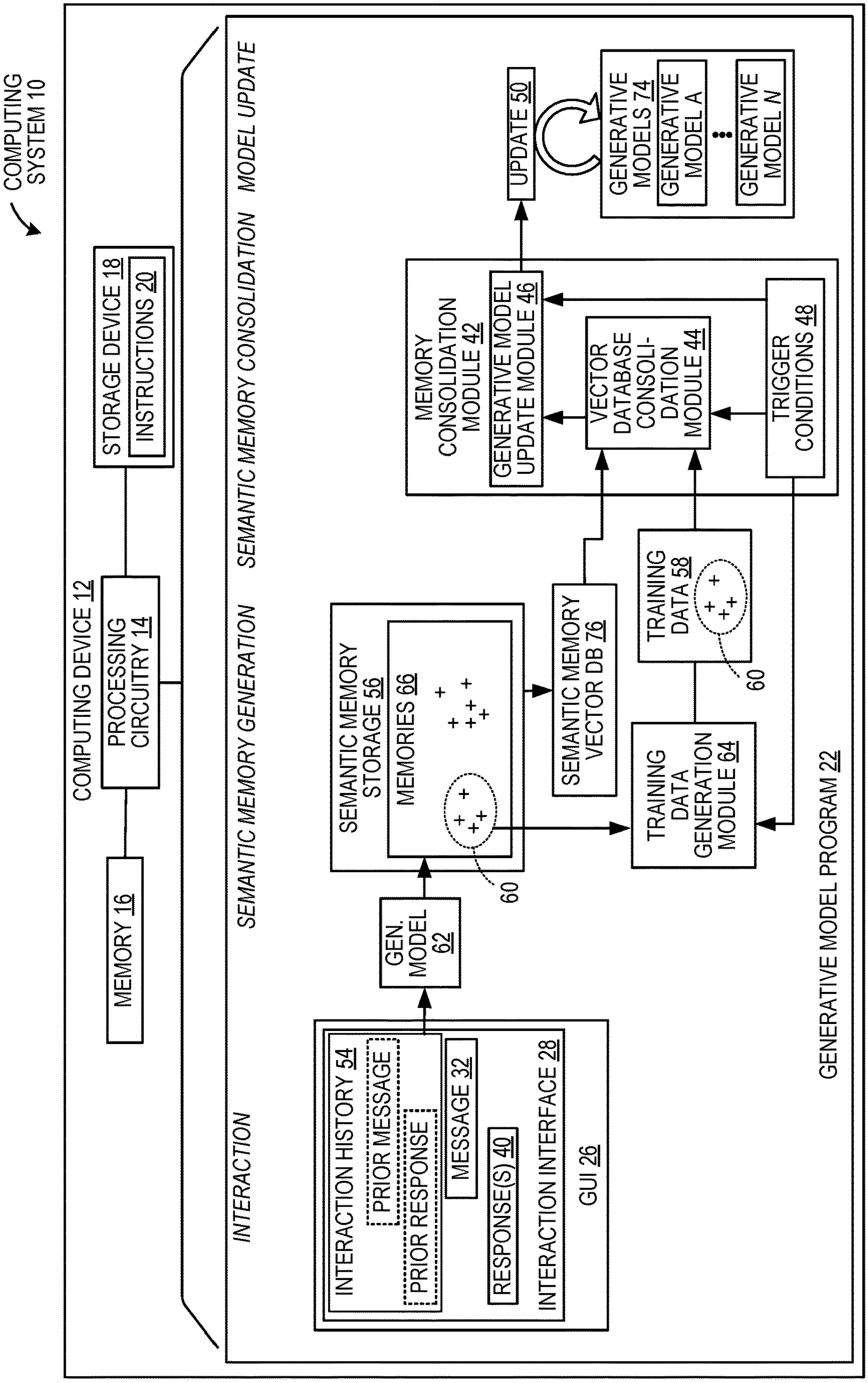
FIG. 2 is a schematic view showing the computing system of FIG. 1, according to another example implementation.

Referring to FIG. 2, an additional example implementation is depicted of the memory consolidation module 42 of FIG. 1 in consolidating the memory vector database 76 of a generative model 74 by selectively extracting a subset 60 of semantic memories 66 from a semantic memory storage 56 and retaining a remainder of the semantic memories in the semantic memory storage 56. The semantic memories 66 may be extracted from the user interaction history 54 by using a trained memory-extracting generative model 62. The semantic memories 66 may include natural language text descriptions of interactions in the user interaction history 54 generated by the memory-extracting generative model 62. In the semantic memory storage 56, each semantic memory 66 may be linked with associated extracted embeddings, so that the semantic memories 66 are indexed by the embeddings, thereby providing vector search support to the semantic memory storage 56 by linking each embedding to its associated semantic memory 66. In the example of FIG. 2, the semantic memory storage 56 is separate from the semantic memory vector database 76, but it will be appreciated that the semantic memory storage 56 may be a subset of the semantic memory vector database 76 or identical to the semantic memory vector database 76 in other examples and implementations.

The user interaction history 54 may include messages 32 in the chat history as well as contextual information used to generate the messages 32. The contextual information in the persistent user interaction history 54 may include transaction histories, browsing histories, social media activity histories, game play histories, text input histories, and other contextual information that were used to generate the prompts sent to the generative model as input during the user interactions. Thus, the persistent user interaction history 54 can be configured as a record or log capturing the entirety of messages, queries, responses, and other relevant information exchanged during the interaction timeline. The persistent user interaction history 54 may also include timestamps and any additional metadata associated with each interaction. Alternatively, a subset of the aforementioned contextual information may be included in the persistent user interaction history 54. The persistent user interaction history 54 can be configured to save and retain a user interaction history across multiple interaction sessions. The persistent user interaction history 54 is said to be persistent because it can retain user interaction histories from prior sessions in this manner, rather than deleting or forgetting such prior user interaction histories in an ephemeral manner.

In this example, as a user interacts with one or more generative models 74, the series of messages 32 and responses 40 that are displayed in the interaction interface 28 are stored as the user interaction history 54, and then semantic memories 66 based on the user interaction history 54 are generated and stored in the semantic memory storage 56.

A training data generation module 64 extracts a subset 60 of the semantic memories 66 from the semantic memory storage 56 which is determined according to predefined memory selection criteria, and retains a remainder of the semantic memories 66 in the semantic memory storage 56. The extracted subset 60 of semantic memories 66 is subsequently inputted into the memory vector database consolidation module 44 as selected training data 58 to train and update the generative model 74 using the extracted subset 60 of semantic memories 66.

For example, the predefined memory selection criteria may include one or more of a length of time a semantic memory has persisted in the semantic memory storage 56, and an effectiveness of a semantic memory in formulating responses as determined by a trained generative language model or an effectiveness evaluation algorithm, for example. The predetermined memory selection criteria may specify that novel pieces of information about topics not previously encountered, non-transient personal information about the user (birthdays, anniversaries, for example), and pieces of information that were explicitly specified by the user as important (requests to remember appointment dates, for example) be extracted from the semantic memories 66 to be included in the training data 58.

The training data 58 is subsequently used to train the generative model 74. For example, when the predetermined trigger condition 48 for initiating the consolidation of the memory vector database 76 is a time condition for performing consolidation every evening, then at the scheduled time, the training data generation module 64 may extract a subset 60 of semantic memories 66 collected during a given calendar day for inclusion in the training data 58 based on the predefined memory selection criteria, and then send the training data 58 to the memory vector database consolidation module 44 to train the generative model 74.

The training of the generative model 74 with the training data 58 transforms the memory vector database 76 to become a representation of the information encountered in the user interaction history 54 and semantic memories 66 that were included in the training data 58 by the training data generation module 64.

The memory vector database consolidation module 44 further consolidates the transformed memory vector database 76 to optimize the memory vector database 76 through fine-tuning processes. The generative model update module 46 of the memory consolidation module 42 subsequently deploys the fine-tuned and consolidated model as an update 50 to the generative models 74. Accordingly, the selectively extracted subset 60 of the semantic memories 66 in the training data 58 effectively contribute to generating a more contextually aware generative model 74. This ensures that the generative model 74 is not only trained on broad training data 58, but also fine-tuned to specific conversational nuances and user preferences as reflected in the user interaction history 54, thereby enhancing the overall effectiveness and user experience of the generative model 74.

Figure 3:
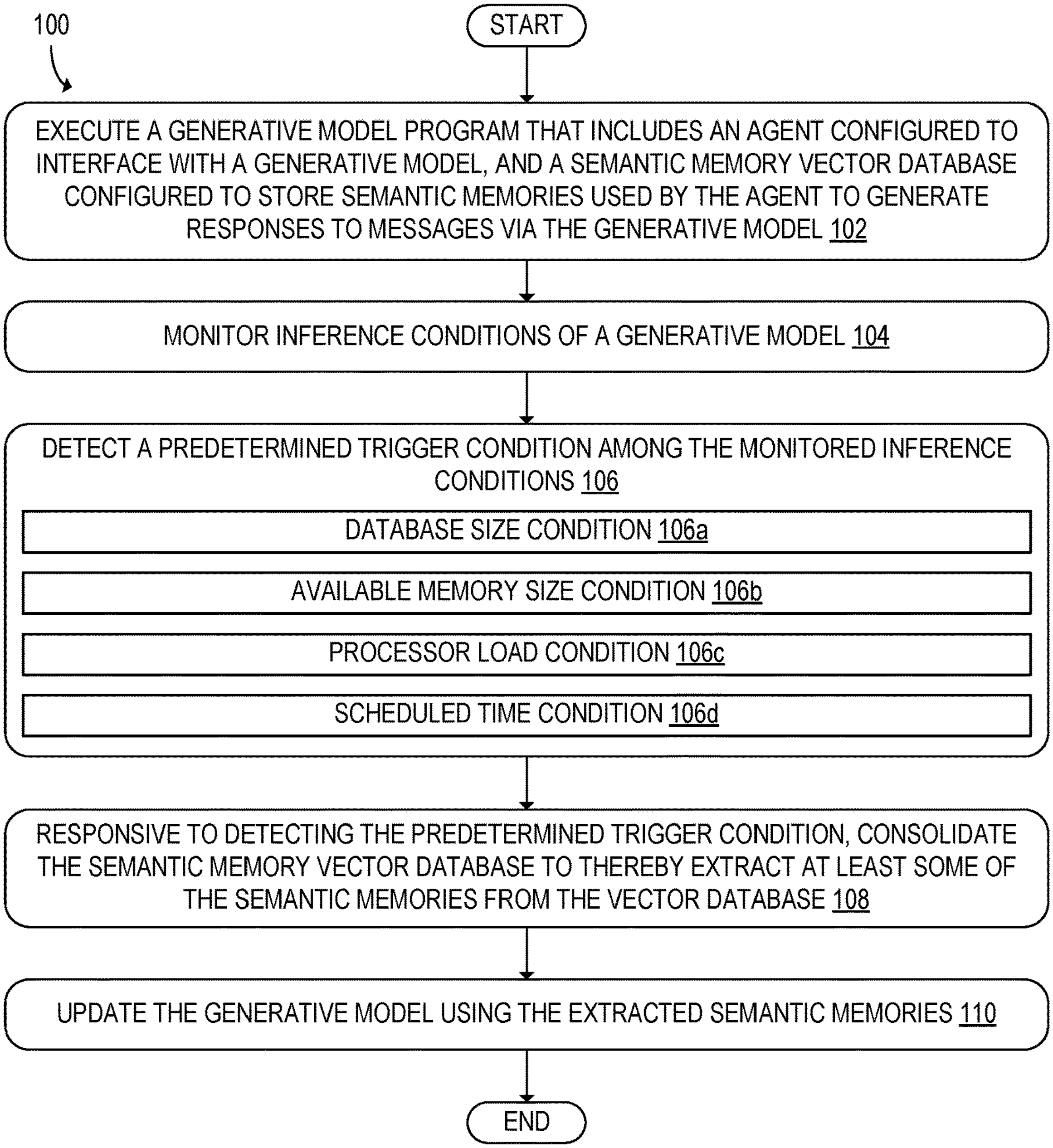
FIG. 3 shows a flowchart for a method for consolidating a memory vector database according to one example implementation.

FIG. 3 is a flowchart that illustrates a method 100 for consolidating semantic memory vector database and updating a generative model. The method 100 may be implemented on the computing system 10 illustrated in FIG. 1 or 2 above, which include processing circuitry and associated memory configured to implement an interaction interface, agents, generative models, semantic memory vector database, and memory consolidation module. Alternatively, other suitable computing hardware and software may be utilized.

At 102, the method includes executing a generative model program that includes an agent configured to interface with a generative model, and a semantic memory vector database configured to store semantic memories used by the agent to generate responses to messages via the generative model.

At 104, the method includes monitoring inference conditions of a generative model. At 106, the method includes detecting a predetermined trigger condition among the monitored inference conditions. The predetermined trigger condition may include at least one of a database size condition 106*a*, an available memory size condition 106*b*, a processor load condition 106*c*, or a scheduled time condition 106*d*. At 108, the method includes, responsive to detecting the predetermined trigger condition, consolidating the semantic memory vector database to thereby extract at least some of the semantic memories from the vector database. At 110, the method includes updating the generative model by using the extracted semantic memories. Other aspects of the method are described above in relation to the functioning of the computing system 10.

The above-described systems and methods monitor inference conditions and consolidate the memory vector databases of generative models when predetermined trigger conditions are met, thereby providing an effective solution for managing the growing vector memory of user AI models by performing periodic fine-tuning as important information is digested, thereby ensuring their continued efficiency and relevance to the user's needs.

In some embodiments, the methods and processes described herein may be tied to a computing system of one or more computing devices. In particular, such methods and processes may be implemented as a computer-application program or service, an application-programming interface (API), a library, and/or other computer-program product.

Figure 4:
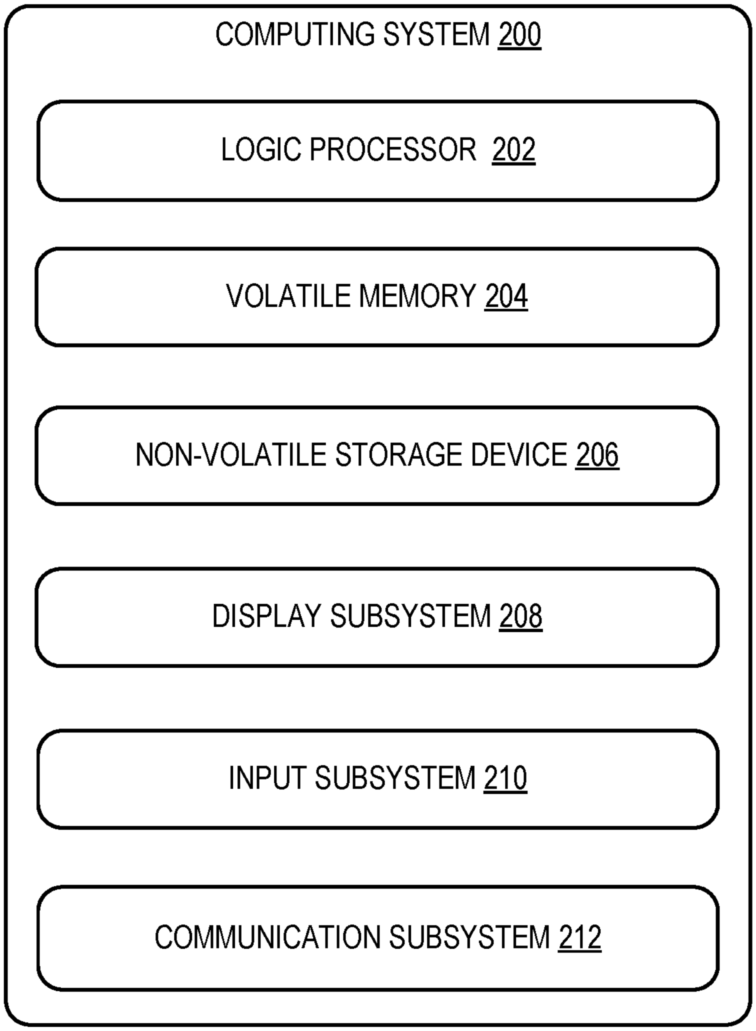
FIG. 4 shows a schematic view of an example computing environment in which the computing system of FIG. 1 of 2 may be enacted.

FIG. 4 schematically shows a non-limiting embodiment of a computing system 200 that can enact one or more of the methods and processes described above. Computing system 200 is shown in simplified form. Computing system 200 may embody the computing system 10 described above and illustrated in FIG. 1 or 2. Components of computing system 200 may be included in one or more personal computers, server computers, tablet computers, home-entertainment computers, network computing devices, video game devices, mobile computing devices, mobile communication devices (for example, smartphone), and/or other computing devices, and wearable computing devices such as smart wristwatches and head mounted augmented reality devices.

Computing system 200 includes processing circuitry 202, volatile memory 204, and a non-volatile storage device 206. Computing system 200 may optionally include a display subsystem 208, input subsystem 210, communication subsystem 212, and/or other components not shown.

Processing circuitry typically includes one or more logic processors, which are physical devices configured to execute instructions. For example, the logic processors may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors configured to execute software instructions. Additionally or alternatively, the logic processor may include one or more hardware logic circuits or firmware devices configured to execute hardware-implemented logic or firmware instructions. Processors of the processing circuitry 202 may be single-core or multi-core, and the instructions executed thereon may be configured for sequential, parallel, and/or distributed processing. Individual components of the processing circuitry optionally may be distributed among two or more separate devices, which may be remotely located and/or configured for coordinated processing. For example, aspects of the computing system disclosed herein may be virtualized and executed by remotely accessible, networked computing devices configured in a cloud-computing configuration. In such a case, these virtualized aspects are run on different physical logic processors of various different machines, it will be understood. These different physical logic processors of the different machines will be understood to be collectively encompassed by processing circuitry 202.

Non-volatile storage device 206 includes one or more physical devices configured to hold instructions executable by the processing circuitry to implement the methods and processes described herein. When such methods and processes are implemented, the state of non-volatile storage device 206 may be transformed—e.g., to hold different data.

Non-volatile storage device 206 may include physical devices that are removable and/or built in. Non-volatile storage device 206 may include optical memory, semiconductor memory, and/or magnetic memory, or other mass storage device technology. Non-volatile storage device 206 may include nonvolatile, dynamic, static, read/write, read-only, sequential-access, location-addressable, file-addressable, and/or content-addressable devices. It will be appreciated that non-volatile storage device 206 is configured to hold instructions even when power is cut to the non-volatile storage device 206.

Volatile memory 204 may include physical devices that include random access memory. Volatile memory 204 is typically utilized by processing circuitry 202 to temporarily store information during processing of software instructions. It will be appreciated that volatile memory 204 typically does not continue to store instructions when power is cut to the volatile memory 204.

Aspects of processing circuitry 202, volatile memory 204, and non-volatile storage device 206 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 200 typically implemented in software by a processor to perform a particular function using portions of volatile memory, which function involves transformative processing that specially configures the processor to perform the function. Thus, a module, program, or engine may be instantiated via processing circuitry 202 executing instructions held by non-volatile storage device 206, using portions of volatile memory 204. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc.

The terms “module,” “program,” and “engine” may encompass individual or groups of executable files, data files, libraries, drivers, scripts, database records, etc.

When included display subsystem 208 may be used to present a visual representation of data held by non-volatile storage device 206. The visual representation may take the form of a GUI. As the herein described methods and processes change the data held by the non-volatile storage device, and thus transform the state of the non-volatile storage device, the state of display subsystem 208 may likewise be transformed to visually represent changes in the underlying data. Display subsystem 208 may include one or more display devices utilizing virtually any type of technology. Such display devices may be combined with processing circuitry 202, volatile memory 204, and/or non-volatile storage device 206 in a shared enclosure, or such display devices may be peripheral display devices.

When included, input subsystem 210 may comprise or interface with one or more user-input devices such as a keyboard, mouse, touch screen, camera, or microphone.

When included, communication subsystem 212 may be configured to communicatively couple various computing devices described herein with each other, and with other devices. Communication subsystem 212 may include wired and/or wireless communication devices compatible with one or more different communication protocols. As non-limiting examples, the communication subsystem may be configured for communication via a wired or wireless local- or wide-area network, broadband cellular network, etc. In some embodiments, the communication subsystem may allow computing system 200 to send and/or receive messages to and/or from other devices via a network such as the Internet.

The following paragraphs provide additional support for the claims of the subject application. One aspect provides a computing system comprising processing circuitry configured to execute a generative model program that includes an agent configured to interface with a generative model, and a semantic memory vector database configured to store semantic memories used by the agent to generate responses to messages via the generative model, monitor inference conditions of the generative model, detect a predetermined trigger condition among the monitored inference conditions, responsive to detecting the predetermined trigger condition, consolidate the semantic memory vector database to thereby extract at least some of the semantic memories from the vector database, and update the generative model using the extracted semantic memories. In this aspect, additionally or alternatively, the generative model may be updated using a Low-Rank Adaptation (LoRA) algorithm, a delta model applied to the output of a base model of the generative model, and/or fine tuning of the generative model. In this aspect, additionally or alternatively, the fine tuning of the generative model may be performed by training the generative model using a training data set that includes the extracted semantic memories, and/or the fine tuning of a delta model may be performed by training a delta model used with the generative model using a training data set that includes the extracted semantic memories. In this aspect, additionally or alternatively, the processing circuitry may be configured to consolidate the semantic memory vector database by extracting a subset of semantic memories from the semantic memory vector database and retaining a remainder of the semantic memories in the semantic memory vector database. In this aspect, additionally or alternatively, the subset of semantic memories to be extract and the remainder of the semantic memories to be retained may be determined according to memory selection criteria including one or more of a length of time a semantic memory has persisted in the semantic memory vector database, and an effectiveness of a semantic memory in formulating responses. In this aspect, additionally or alternatively, the predetermined trigger condition may be at least one of a database size condition, an available memory size condition, a processor load condition, or a scheduled time condition. In this aspect, additionally or alternatively, the scheduled time condition may include one or more of a maintenance schedule, a software update schedule, a memory consolidation schedule, and a model update schedule. In this aspect, additionally or alternatively, the predetermined trigger condition may be based on network traffic analysis. In this aspect, additionally or alternatively, the predetermined trigger condition may be at least one of response times, variability in response times, processor usage, memory usage or bandwidth consumption of the generative model. In this aspect, additionally or alternatively, the agent may be one of a plurality of agents called in a cognitive workflow that processes a prompt to generate the response, and the semantic memory vector database may include shared memory accessible to the plurality of agents and agent-specific memory exclusive to each agent, and semantic memories stored in the shared memory accessible to the plurality of agents may be consolidated by the processing circuitry upon detection of the predetermined trigger condition.

Another aspect provides a computing method comprising executing a generative model program that includes an agent configured to interface with a generative model, and a semantic memory vector database configured to store semantic memories used by the agent to generate responses to messages via the generative model, monitoring inference conditions of the generative model, detecting a predetermined trigger condition among the monitored inference conditions, and responsive to detecting the predetermined trigger condition, consolidating the semantic memory vector database to thereby extract at least some of the semantic memories from the vector database, and updating the generative model using the extracted semantic memories. In this aspect, additionally or alternatively, updating the generative model may be performed at least in part by using a Low-Rank Adaptation (LoRA) algorithm, a delta model applied to the output of a base model of the generative model, and/or fine tuning of the generative model. In this aspect, additionally or alternatively, the fine tuning of the generative model may be performed by training the generative model using a training data set that includes the extracted semantic memories, and/or the fine tuning of the delta model may be performed by training the delta model using a training data set that includes the extracted semantic memories. In this aspect, additionally or alternatively, consolidating the semantic memory vector database may be performed at least in part by extracting a subset of semantic memories from the semantic memory vector database and retaining a remainder of the semantic memories in the semantic memory vector database. In this aspect, additionally or alternatively, the computing method may further comprise determining the subset of semantic memories to be extracted and the remainder of the semantic memories to be retained according to memory selection criteria including one or more of a length of time a semantic memory has persisted in the semantic memory vector database, and an effectiveness of a semantic memory in formulating responses. In this aspect, additionally or alternatively, the predetermined trigger condition may be at least one of a database size condition, an available memory size condition, a processor load condition, or a scheduled time condition. In this aspect, additionally or alternatively, the scheduled time condition may include one or more of a maintenance schedule, a software update schedule, a memory consolidation schedule, and a model update schedule. In this aspect, additionally or alternatively, the predetermined trigger condition may be at least one of response times, variability in response times, processor usage, memory usage or bandwidth consumption of the generative model. In this aspect, additionally or alternatively, the agent may be one of a plurality of agents called in a cognitive workflow that processes a prompt to generate the response, and the semantic memory vector database may include shared memory accessible to the plurality of agents and agent-specific memory exclusive to each agent, and semantic memories stored in the shared memory accessible to the plurality of agents may be consolidated upon detection of the predetermined trigger condition.

Another aspect provides a computing system comprising processing circuitry configured to execute a generative model program that includes an agent configured to interface with a generative model, and a semantic memory vector database configured to store semantic memories used by the agent to generate responses to messages via the generative model, monitor inference conditions of the generative model, detect a predetermined trigger condition among the monitored inference conditions, wherein the predetermined trigger condition is at least one of a database size condition, an available memory size condition, a processor load condition, or a scheduled time condition, responsive to detecting the predetermined trigger condition, consolidate the semantic memory vector database to thereby extract at least some of the semantic memories from the vector database, and update the generative model by training the generative model using a training data set that includes the extracted semantic memories.

"And/or" as used herein is defined as the inclusive or V, as specified by the following truth table:

| A | B | A $\vee$ B |
|---|---|---|
| True | True | True |
| True | False | True |
| False | True | True |
| False | False | False |

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system comprising:

processing circuitry configured to:

execute a generative model program that includes an agent configured to interface with a generative model, and a semantic memory vector database configured to store semantic memories used by the agent to generate responses to messages via the generative model;

monitor inference conditions of the generative model;

detect a predetermined trigger condition among the monitored inference conditions;

responsive to detecting the predetermined trigger condition, consolidate the semantic memory vector database to thereby extract at least some of the semantic memories from the semantic memory vector database, wherein the consolidation deletes the extracted semantic memories in the semantic memory vector database to thereby reduce a size of the semantic memory vector database and reduce a compute time for performing query matching and semantic memory retrieval using the semantic memory vector database; and update the generative model using the extracted semantic memories, so that information contained in the deleted extracted semantic memories is retained by the generative model.

2. The computing system of claim 1, wherein the generative model is updated using a Low-Rank Adaptation (LoRA) algorithm, a delta model applied to the output of a base model of the generative model, and/or fine tuning of the generative model.

3. The computing system of claim 2, wherein the fine tuning of the generative model is performed by training the generative model using a training data set that includes the extracted semantic memories, and/or the fine tuning of the delta model is performed by training the delta model used with the generative model using a training data set that includes the extracted semantic memories.

4. The computing system of claim 1, wherein the processing circuitry is configured to consolidate the semantic memory vector database by extracting a subset of semantic memories from the semantic memory vector database and retaining a remainder of the semantic memories in the semantic memory vector database.

5. The computing system of claim 4, wherein the subset of semantic memories to be extracted and the remainder of the semantic memories to be retained are determined according to memory selection criteria including one or more of:

a length of time a semantic memory has persisted in the semantic memory vector database; and an effectiveness of a semantic memory in formulating responses.

6. The computing system of claim 1, wherein the predetermined trigger condition is at least one of a database size condition, an available memory size condition, a processor load condition, or a scheduled time condition.

7. The computing system of claim 6, wherein the scheduled time condition includes one or more of a maintenance schedule, a software update schedule, a memory consolidation schedule, and a model update schedule.

8. The computing system of claim 1, wherein the predetermined trigger condition is based on network traffic analysis.

9. The computing system of claim 1, wherein the predetermined trigger condition is at least one of response times, variability in response times, processor usage, memory usage or bandwidth consumption of the generative model.

10. The computing system of claim 1, wherein the agent is one of a plurality of agents called in a cognitive workflow that processes a prompt to generate the responses, and the semantic memory vector database includes shared memory accessible to the plurality of agents and agent-specific memory exclusive to each agent, and semantic memories stored in the shared memory accessible to the plurality of agents are consolidated by the processing circuitry upon detection of the predetermined trigger condition.

11. A computing method comprising:

executing a generative model program that includes an agent configured to interface with a generative model, and a semantic memory vector database configured to store semantic memories used by the agent to generate responses to messages via the generative model;

monitoring inference conditions of the generative model;

detecting a predetermined trigger condition among the monitored inference conditions; and responsive to detecting the predetermined trigger condition, consolidating the semantic memory vector database to thereby extract at least some of the semantic memories from the semantic memory vector database, wherein the consolidation deletes the extracted semantic memories in the semantic memory vector database to thereby reduce a size of the semantic memory vector database and reduce a compute time for performing query matching and semantic memory retrieval using the semantic memory vector database; and updating the generative model using the extracted semantic memories, so that information contained in the deleted extracted semantic memories is retained by the generative model.

12. The computing method of claim 11, wherein updating the generative model is performed at least in part by using a Low-Rank Adaptation (LoRA) algorithm, a delta model applied to the output of a base model of the generative model, and/or fine tuning of the generative model.

13. The computing method of claim 12, wherein the fine tuning of the generative model is performed by training the generative model using a training data set that includes the extracted semantic memories, and/or the fine tuning of the delta model is performed by training the delta model using a training data set that includes the extracted semantic memories.

14. The computing method of claim 11, wherein consolidating the semantic memory vector database is performed at least in part by extracting a subset of semantic memories from the semantic memory vector database and retaining a remainder of the semantic memories in the semantic memory vector database.

15. The computing method of claim 14, further comprising determining the subset of semantic memories to be extracted and the remainder of the semantic memories to be retained according to memory selection criteria including one or more of:

a length of time a semantic memory has persisted in the semantic memory vector database; and an effectiveness of a semantic memory in formulating responses.

16. The computing method of claim 11, wherein the predetermined trigger condition is at least one of a database size condition, an available memory size condition, a processor load condition, or a scheduled time condition.

17. The computing method of claim 16, wherein the scheduled time condition includes one or more of a maintenance schedule, a software update schedule, a memory consolidation schedule, and a model update schedule.

18. The computing method of claim 11, wherein the predetermined trigger condition is at least one of response times, variability in response times, processor usage, memory usage or bandwidth consumption of the generative model.

19. The computing method of claim 11, wherein the agent is one of a plurality of agents called in a cognitive workflow that processes a prompt to generate the responses, and the semantic memory vector database includes shared memory accessible to the plurality of agents and agent-specific memory exclusive to each agent, and semantic memories stored in the shared memory accessible to the plurality of agents are consolidated upon detection of the predetermined trigger condition.

20. A computing system comprising:

processing circuitry configured to:

execute a generative model program that includes an agent configured to interface with a generative model, and a semantic memory vector database configured to store semantic memories used by the agent to generate responses to messages via the generative model;

monitor inference conditions of the generative model;

detect a predetermined trigger condition among the monitored inference conditions, wherein the predetermined trigger condition is at least one of a database size condition, an available memory size condition, a processor load condition, or a scheduled time condition;

responsive to detecting the predetermined trigger condition, consolidate the semantic memory vector database to thereby extract at least some of the semantic memories from the semantic memory vector database, wherein the consolidation deletes the extracted semantic memories in the semantic memory vector database to thereby reduce a size of the semantic memory vector database and reduce a compute time for performing query matching and semantic memory retrieval using the semantic memory vector database; and update the generative model by training the generative model using a training data set that includes the extracted semantic memories, so that information contained in the deleted extracted semantic memories is retained by the generative model.

* * * * *